United States Patent
Mende

(10) Patent No.: US 12,146,976 B2
(45) Date of Patent: Nov. 19, 2024

(54) SYSTEM FOR CONTROLLING A TRAFFIC MANAGEMENT SYSTEM AT AN INTERSECTION

(71) Applicant: S.M.S., SMART MICROWAVE SENSORS GMBH, Braunschweig (DE)

(72) Inventor: Ralph Mende, Braunschweig (DE)

(73) Assignee: S.M.S. SMART MICROWAVE SENSORS GMBH, Braunschweig (DE)

( * ) Notice: Subject to any disclaimer, the term of this patent is extended or adjusted under 35 U.S.C. 154(b) by 792 days.

(21) Appl. No.: 17/261,897

(22) PCT Filed: Jul. 11, 2019

(86) PCT No.: PCT/EP2019/068720
§ 371 (c)(1),
(2) Date: Jan. 21, 2021

(87) PCT Pub. No.: WO2020/020655
PCT Pub. Date: Jan. 30, 2020

(65) Prior Publication Data
US 2021/0286072 A1    Sep. 16, 2021

(30) Foreign Application Priority Data
Jul. 26, 2018  (DE) ............. 10 2018 118 150.7

(51) Int. Cl.
*G01S 13/91*    (2006.01)
*G01S 7/00*    (2006.01)
(Continued)

(52) U.S. Cl.
CPC ............ *G01S 7/003* (2013.01); *G01S 13/584* (2013.01); *G01S 13/87* (2013.01); *G01S 13/91* (2013.01);
(Continued)

(58) Field of Classification Search
CPC ........ G01S 7/003; G01S 13/584; G01S 13/87; G01S 13/91; G01S 7/0232; G01S 7/0233;
(Continued)

(56) References Cited

U.S. PATENT DOCUMENTS

| 2007/0096943 A1* | 5/2007 | Arnold ............... G01S 13/66 340/925 |
| 2011/0205086 A1* | 8/2011 | Lamprecht ............ G08G 1/08 340/928 |

(Continued)

FOREIGN PATENT DOCUMENTS

| AU | 2014202300 A1 | 11/2014 |
| CN | 104134354 A | 11/2014 |

(Continued)

OTHER PUBLICATIONS

Bourdoux, U. Ahmad, D. Guermandi, S. Brebels, A. Dewilde and W. Van Thillo, "PMCW waveform and MIMO technique for a 79 GHz CMOS automotive radar," 2016 IEEE Radar Conference (RadarConf), Philadelphia, PA, USA, 2016, pp. 1-5, doi: 10.1109/RADAR.2016.7485114.*

(Continued)

Primary Examiner — Brian P Sweeney
(74) Attorney, Agent, or Firm — WC&F IP

(57) ABSTRACT

Examples include a system for controlling traffic signalling devices at an intersection, including a first radar sensor that detects road users in a first detection region on a first traffic route, outputting first radar sensor data indicating first sensor detected positions and a first sensor detected radial velocities, and a second radar sensor that detects road users in a second detection region on a second traffic route, outputting second sensor data indicating second sensor detected positions and a second sensor detected velocities. The first radar sensor and second radar sensor are at different locations, or different orientations, or both, and configured such that the (Continued)

first and second detection region have an overlap. An electronic data processing device combines the first radar sensor data and second radar sensor data into combination signals, and controls the traffic signalling devices based at least partially on the combination signals.

16 Claims, 3 Drawing Sheets

(51) Int. Cl.
*G01S 7/02* (2006.01)
*G01S 13/58* (2006.01)
*G01S 13/87* (2006.01)
*G08G 1/01* (2006.01)
*G08G 1/08* (2006.01)
*G01S 13/931* (2020.01)

(52) U.S. Cl.
CPC .......... *G08G 1/0116* (2013.01); *G08G 1/0133* (2013.01); *G08G 1/08* (2013.01); *G01S 7/0232* (2021.05); *G01S 7/0233* (2021.05); *G01S 7/0234* (2021.05); *G01S 13/917* (2019.05); *G01S 2013/9316* (2020.01)

(58) Field of Classification Search
CPC .................. G01S 7/0234; G01S 13/917; G01S 2013/9316; G01S 7/023; G01S 13/34; G08G 1/0116; G08G 1/0133; G08G 1/08; G08G 1/0145; G08G 1/015; G08G 1/052
See application file for complete search history.

(56) References Cited

U.S. PATENT DOCUMENTS

| | | |
|---|---|---|
| 2012/0286103 A1* | 11/2012 | Hilleary .................. B61L 29/30 342/173 |
| 2014/0347207 A1 | 11/2014 | Zeng et al. |
| 2017/0067991 A1* | 3/2017 | Liu .......................... G01S 13/87 |
| 2017/0309173 A1 | 10/2017 | Heckmann et al. |
| 2017/0328997 A1 | 11/2017 | Silverstein et al. |
| 2019/0126920 A1 | 5/2019 | You |

FOREIGN PATENT DOCUMENTS

| | | | |
|---|---|---|---|
| CN | 104181534 A | | 12/2014 |
| CN | 104345308 A | * | 2/2015 |
| CN | 107784852 A | | 3/2018 |
| CN | 107972665 A | | 5/2018 |
| JP | 2005-23774 A | | 9/2005 |
| KR | 20160092959 A | | 8/2016 |

OTHER PUBLICATIONS

Bourdoux et al: "PMCW waveform and MIMO technique for a 79 GHz CMOS automative radar", IEEE RADAR Conference, pp. 1-5, May 2, 2016.
Japanese Office Action dated May 31, 2022.

* cited by examiner

SYSTEM FOR CONTROLLING A TRAFFIC MANAGEMENT SYSTEM AT AN INTERSECTION

BACKGROUND

Within the scope of the present invention, intersections are objects where several traffic routes meet. These can be intersections or junctions of two roads but also, for example, highway entrance and exit ramps. The invention is also not limited to road traffic routes. It can also be applied to shipping traffic routes or air traffic routes.

Consequently, traffic flows of at least two traffic routes meet at every intersection. The traffic management system of the individual traffic flows must ensure that, on the one hand, accidents do not occur and, on the other hand, that the individual traffic flows flow as efficiently as possible. To this end, corresponding signalling devices are provided at the intersection, which are designed for road traffic in the form of traffic lights, for example. The signalling systems can be used to give a stop signal or a go signal for different traffic flows, so that it is possible to control which traffic flows can pass through the intersection at what time.

Especially with regard to minimizing fuel consumption of the vehicles of the different traffic flows, it has proven advantageous in the past for the traffic management system at an intersection to be controlled according to demand. For example, at intersections of two traffic routes of different sizes and with different traffic volumes, it is known to give the traffic flow of the respective larger traffic route the clearance signal by default and to only give the smaller traffic route the clearance signal if corresponding sensors detect that a road user on this smaller traffic route is approaching the intersection. Only in this case is the stop signal assigned to the traffic flow of the larger traffic route in the described configuration, so that the road user on the smaller traffic route can pass the intersection area.

Similar configurations are known, for example, for pedestrian traffic lights, where a pedestrian who wants to cross a road at the traffic light, for example, activates an actuating element, for example in the form of a push-button, and thus requests the Clearance signal, i.e. the green traffic light in the above-mentioned example of an embodiment.

In the above-mentioned examples of an embodiment, the control of the traffic management system takes into account the fact that the traffic volumes of the different traffic routes are very different. However, if this is not the case, such demand-oriented control is not possible or only achievable with difficulty.

SUMMARY

The invention therefore aims to thus improve a system for controlling a traffic management system at an intersection.

The invention solves the problem by way of a system for controlling a traffic management system at an intersection of at least two traffic routes, wherein the system comprises a first radar sensor, which has a first detection region, for detecting road users on a first traffic route; a second radar sensor, which has a second detection region, for detecting road users on a second traffic route, wherein the first detection region and the second detection region overlap in at least one overlapping region; and an electronic data processing device, which is configured to at least partially combine the sensor data of the first radar sensor and the sensor data of the second radar sensor into combination signals and to control the traffic management system at the intersection at least also as a function of combination signals. The system preferably features at least one radar sensor for each traffic route that encounters the intersection.

The use of radar sensors, which is known from the prior art for detecting road users, has the advantage that it functions independently of the prevailing light conditions and visibility. The measurement result of a radar sensor is independent of daylight and also works in fog or driving snow. By combining the sensor data from the various radar sensors in the electrical data processing device, the frequency and volume of traffic on all traffic routes of the intersection can be recorded and included in the control of traffic management system.

Therefore, a system for controlling a traffic management system at an intersection of at least two traffic routes, wherein the system comprises a first radar sensor, which has a first detection region, for detecting road users on a first traffic route; a second radar sensor, which has a second detection region, for detecting road users on a second traffic route; and an electronic data processing device that is configured to control the traffic management system at the intersection as a function of the sensor data of the first radar sensor and the sensor data of the second radar sensor, constitutes a separate invention. All preferred embodiments are also applicable to such a system. This also applies in particular if the first detection region and the second detection region overlap in at least one overlapping region.

DETAILED DESCRIPTION

Figure 1:
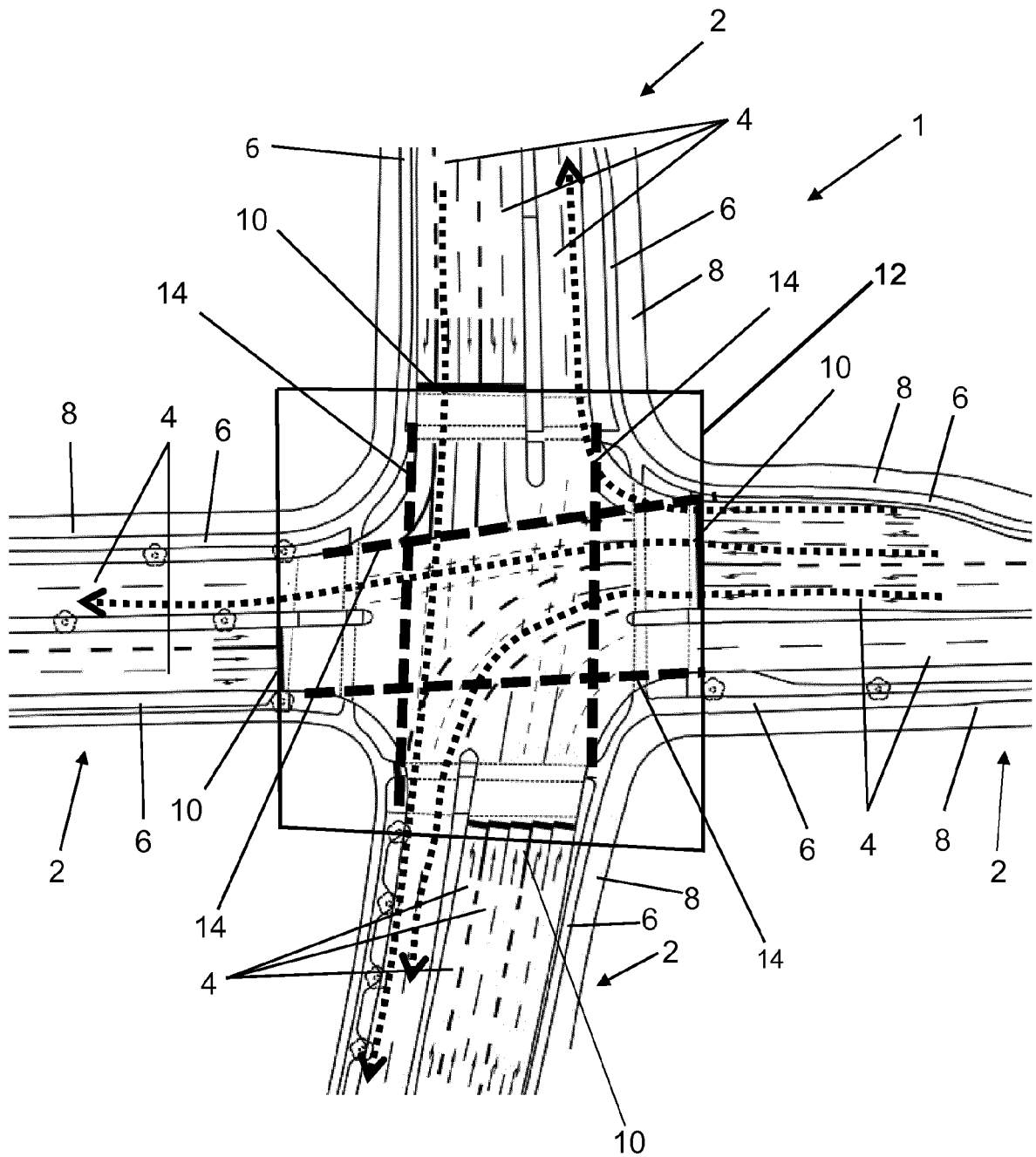
FIG. 1 shows a schematic depiction of a traffic intersection.

Apparatuses according to one or more embodiments can include two or more radar sensors. In an embodiment, each of the radar sensors used has a detection region in which it can detect several road users. The radar sensor emits radar waves that are reflected by the respective road user. These reflected radar waves are received by a receiver part of the radar sensor. From the received data, information about the position and radial velocity of the road user can be determined. The radial velocity is preferably determined with a typical accuracy of less than 0.5 m/s, preferably less than 0.2 m/s, particularly preferably less than 0.1 m/s.

In a system of the type described here, the two detection regions of the different padar sensors overlap in at least one overlapping region. This means in particular that road users located in this overlapping region reflect radar waves from several radar sensors and can thus be detected by each of the radar sensors whose detection regions overlap, so that multiple detection of these road users takes placc. While the radial velocity and position of the road user in relation to each of the radar sensors with the overlapping region can be determined based on the data from each of the radar sensors, it is advantageous for accuracy, resolution and error-proofing to combine the sensor data from several of these sensors to obtain information about the road user.

In a preferred embodiment, the data processing device is configured to obtain information about road users from the sensor data, wherein the information about road users in the overlapping region is obtained from sensor data of the first radar sensor and sensor data of the second radar sensor. The sensor data is generally processed in several stages. First, a so-called raw target detection is carried out. The position and/or radial velocity of the road user who has reflected the emitted radar waves of the respective radar sensor is determined. All that is needed are reflected radar beams received by a radar sensor. In a second processing step, these raw targets are "tracked". Temporal changes in position and/or radial velocity are determined. In principle, this is also possible with the sensor data of only one sensor. However, it is advantageous to combine the sensor data from different radar sensors into combination signals and use these as the basis for the evaluation. Since the radar sensors have different locations and/or orientations, it is advantageous if the positions of the respective road user from each of the radar sensors and the radial velocities of the road user relative to the respective sensor are determined based on sensor data from each of the individual radar sensors, while the following or "tracking" occurs based on the combination signals.

In an alternative embodiment, the sensor data from different radar sensors are already combined into combination signals before the raw target detection takes place.

Each of these embodiments results in information about individual road users in overlapping regions, on the basis of which the traffic management system of the intersection is controlled by the electronic data processing device, the control being determined on the basis of sensor data from several radar sensors which have been combined into combination signals. This has a number of advantages. Since the radial velocities of a road user in relation to two spaced radar sensors run in different directions, it is thus possible, for example, to completely determine the velocity vector, at least within one plane. This is particularly advantageous if the traffic routes in the area before the intersection are not straight but take the form of curves. If a road user is in the vicinity of two detection regions, he is hit by radar waves from different directions. The reflection cross-section, which is a measure of the strength of the backscatter, can be very different in different directions. For example, a cyclist who is irradiated with radar waves from the front has a significantly smaller reflection cross-section and thus generates a significantly lower reflection signal than the same cyclist who is irradiated with the same radar waves from the side, for example from the left or right. In particular, small road users such as pedestrians or cyclists, and especially children, can be detected and tracked much better and more reliably by combining the sensor data of different radar sensors into combined signals.

The control of the traffic management system at an intersection is usually based on information about road users, which includes, for example, a traffic volume, a velocity distribution or a classification of vehicle and other road users. The combination of sensor data from different radar sensors into combined signals can therefore provide a better data basis for controlling the traffic management system.

In a preferred embodiment of the system, at least one of the radar sensors, but preferably several or particularly preferably all radar sensors, is set up and arranged to detect a road user also in an inner intersection region and/or an extended inner intersection region.

An intersection is divided into an inner intersection region, an extended inner intersection region and an outer intersection region. The traffic routes leading to the intersection form the outer intersection region. It ends at the respective stop lines of the individual traffic routes, regardless of whether they are part of a road marking or not. The inner intersection region is the area that is actually part of all traffic routes leading to the intersection. If two roads intersect at right angles, the inner intersection region forms a quadrilateral if the traffic routes are of different widths, and a square if they are of equal width. Between the inner intersection region and the outer intersection region is the extended inner intersection region, which is thus bordered on one side by the respective stop lines of the traffic routes and on the other side by the inner intersection region. This extended inner intersection region contains, for example, pedestrian crossings, cycle paths and other elements.

Especially at intersections of traffic routes that not only have motor vehicle lanes but also, in particular, cycle paths and footpaths, road users can be expected to be significantly less protected in the event of an accident than is the case, for example, with motor vehicles or lorries. These vulnerable road users (VRU) require special protection, as accidents involving these road users often end in serious injury or even death of the road user. Especially turning lorries, which have a relatively large blind spot, are a danger here. Therefore, it has proven to be advantageous if at least one, but preferably all radar sensors used can at least also detect the extended inner intersection region, but particularly preferably the extended inner intersection region and the inner intersection region, in order to be able to detect road users here as well. It is particularly advantageous if the overlapping region of at least two radar sensors, but preferably of further radar sensors, is located in this extended inner intersection region and/or the inner intersection region.

This means that not only road users approaching the intersection or, for example, standing at a traffic light in front of the intersection waiting for a clearance signal can be detected. It is also possible to detect vehicles and road users that are in the inner intersection region. If an unforeseen event occurs here, for example if a vehicle breaks down or a rear-end collision takes place, this can be detected by the at least one radar sensor and included in the control of the traffic management system. For example, a clearance signal can be given only for the lanes that are not affected by the event in the inner intersection region and/or in the extended inner intersection region.

Figure 2:
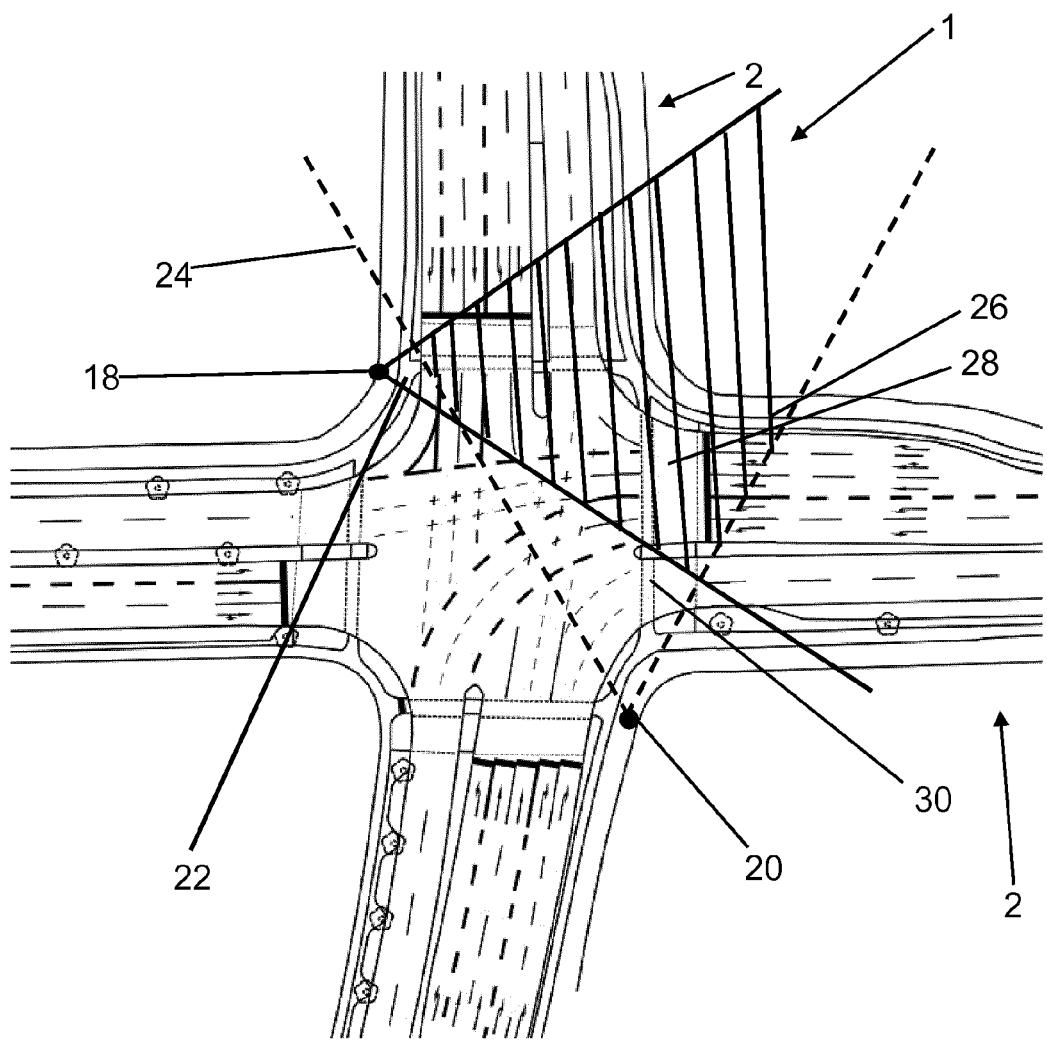
FIG. 2 shows a schematic depiction of the traffic intersection schematically depicted in FIG. 1, with two schematically depicted radar sensors.

Preferably, the system, preferably a first radar sensor such as the first radar sensor 18 on FIG. 2 described in more detail later and/or a second radar sensor such as the second radar sensor 20 on FIG. 2, is configured to determine a position and a radial velocity of road users in the respective detection region of the respective radar sensor in a measurement cycle from the sensor data of the respective radar sensor. Particularly preferably, this is already done within the respective radar sensor. This also makes it possible to determine the future traffic volume at the intersection, for example the traffic volume to be expected within the next half minute, and to adjust the control of the traffic management system accordingly.

The larger the detection region of the respective radar sensors on the respective traffic route, the further in advance the control of the traffic management system can be adapted to the future traffic volume. The determination is preferably made by the respective sensors. In order to determine the position and radial velocity of a road user relative to a radar sensor, measurement values of a single measurement cycle, which for example has a plurality, for instance radar signals in the form of 128, 256 or 512 emitted frequency ramps, are sufficient. This allows the position and relative velocity to be determined often and in quick succession. This ensures that, in particular, the tracking of road users (tracking of raw targets) is possible in a precise and temporally well-resolved manner.

Alternatively or additionally, the position and radial velocity are determined by the electronic data processing device. In the embodiments of the invention described, this does not have to be implemented by a single device, but can be distributed over various devices and sub-devices. Also regarding the determination by the electronic data processing device, sensor data from only one of the radar sensors is preferably used to determine the position and the radial velocity.

It is advantageous if the electronic data processing device is not only set up to control the traffic management system, but also to transmit information about detected road users to other detected road users. This is particularly advantageous if the road user, for example a motor vehicle, has a corresponding interface to process this data. Car-2-X technology is preferably used for this purpose, especially in the form of Car-2-Infrastructure.

Additionally or alternatively, the electronic data processing device is configured to transmit information about future control measures to detected road users. This information, which is sent to the road user, can be shown to the driver on the display of a motor vehicle, for example. The driver thus receives early information, for example, that the signal that is relevant for him, for example a traffic light, will change within the next few seconds. Abrupt and surprising braking due to a sudden signal change is thus prevented. This is an advantage for the fuel consumption of the respective vehicle and, of course, also for road safety, as a vehicle that brakes abruptly represents a danger for following road users. Car-2-X technology is preferably used for this purpose, especially in the form of Car-2-Infrastructure.

In a particularly preferred embodiment, the radar sensors and/or the electronic data processing device are configured to assign detected road users to a vehicle class, a lane and/or a direction of travel. This information can also be used as a basis for controlling the traffic management system.

The detected road user can be located in the inner intersection region, in the extended inner intersection region or in the outer intersection region, for example at a distance of more than 35 m, preferably more than 45 m, particularly preferably more than 75 m from the intersection. The assignment of the road user to a lane, which can also be called a traffic lane, occurs, for example, via a trajectory covered by the road user during tracking. This is particularly beneficial for those areas of the intersection where the corresponding lanes or traffic lanes have not been identified by lane markings. This is particularly the case in the inner intersection region.

If, for example, one of the radar sensors and/or the electronic data processing device detects that a heavy vehicle, for example a truck, is approaching on one of the traffic routes at a speed at which it reaches the intersection shortly before or shortly after the changeover of a traffic light signal from the clear signal to the stop signal, the control system can extend the corresponding clearance phase for this traffic route by a few seconds in order to prevent an unnecessary abrupt and complete braking of this heavy road user. This also reduces the road user's fuel consumption on the one hand, as restarting and accelerating is avoided, and increases road safety on the other hand, as following road users do not have to react to a suddenly braking truck. In this way, the mass and/or speed of road users can be incorporated into the control of traffic management system.

For example, if one of the radar sensors detects a lorry in a right-turn lane and a cyclist in the adjacent cycle lane, this can also be included in the control. The corresponding information can be transmitted to the truck and shown on the vehicle's display, so that the danger to the cyclist posed by the driver of the truck possibly overlooking the cyclist when turning right can be drastically reduced.

If the intersection has signalling systems for different driving and traffic directions of the respective traffic routes, e.g. separate traffic lights for right-turners, left-turners and for straight drivers, these can be controlled independently of each other. If there are several lanes in the same direction, for example two lanes for straight ahead, these can also be assigned different control signals if necessary, for example if a vehicle has come to a standstill on one of the lanes in the interior of the intersection or a turning process has not been completed or has not been completed properly. In a particularly preferred embodiment, the radar sensors and/or the electronic data processing device are configured to assign detected road users to a curved lane. This is particularly advantageous if the detection range of the radar sensors extends relatively far, for example more than 100 metres, preferably more than 200 metres, especially preferably more than 300 metres, into the respective traffic route. Since the lanes do not usually run in a straight line over this distance, it is advantageous for the efficient control of traffic management system to be able to allocate the vehicles correctly to these curved lanes as well.

Preferably, the system is set up for Stop Bar Detection, Queue Length, Advance Detection, Speed Enforcement, Red Light Enforcement and/or ETA (Estimated Time of Arrival) applications and/or for counting and/or classifying road users. "Stop Bar Detection" is the monitoring of a stop line. On the one hand, this includes monitoring whether road users adhere to current stop signals. On the other hand, by monitoring the area in front of a stop line, it is also possible to determine whether and, if so, when the respective lane or traffic route should be switched from the stop signal to the clearance signal. This also applies for the "Queue Length" application. Here, too, the length of the tailback in front of a traffic sign system is used to determine whether and, if so, when this traffic sign is switched from the stop signal to the clearance signal. The "Advance Detection" application monitors approaching traffic that has not yet come to a stop before a stop signal. This application can be used, for example, to control the length of a clearance signal by deciding when is the optimal time to switch the traffic sign system from the clearance signal to the stop signal in order to achieve the most efficient traffic control. In this case, the clearance phase can be controlled, for example, so that approaching particularly heavy road users do not have to brake.

The applications "Speed Enforcement" and "Red Light Enforcement" detect traffic violations. These may be a speeding violation in the "Speed Enforcement" application or a red light violation in the "Red Light Enforcement" application. The "ETA" application determines the estimated time of arrival of a detected vehicle at an intersection. This can be used for intelligent control of a traffic light phase, for example.

Preferably, the first radar sensor and the second radar sensor are synchronised in terms of time, wherein measurements are preferably carried out simultaneously, alternately or offset in time. In this way, interference can be avoided and, in addition, the data from the two sensors can be efficiently brought together in the electronic data processing device.

It is advantageous if the first radar sensor and the second radar sensor are configured to transmit radar signals in the form of frequency ramps (FMCW), wherein the radar signals can differ in frequency ramp duration, frequency ramp stroke and/or frequency ramp repetition frequency of the first and the second radar sensor. The first radar sensor and/or the second radar sensor can be set up to emit different frequency ramps simultaneously or consecutively.

If the radar sensors have different frequency ramp signals that differ, for example, in frequency ramp stroke, frequency ramp slope, frequency ramp duration and/or frequency ramp repetition frequency, the signals of the different sensors can already be easily distinguished in the sensors and interference can be eliminated.

Differentiation of the various radar waves emitted by the different radar sensors and reflected by road users can also be ensured by setting up the first radar sensor and the second radar sensor to emit radar waves of different frequencies. In particular, frequency modulated radar waves (FMCW) can be emitted, using different start frequencies and/or centre frequencies in the two radar sensors.

Alternatively or additionally, the first radar sensor and the second radar sensor are preferably set up to emit phase modulated radar waves (PMCW), whereby the digital codes used in each case for phase modulation differ; preferably they are orthogonal to each other.

All these possibilities (for example, temporal offset, spatial offset, phase offset or frequency offset), which can be applied individually or in combination, serve to make the radar waves and the radar sensors distinguishable from each other in order to avoid interference between the radar sensors when combining the different signals into combination signals.

FIG. 1 shows a schematic depiction of a traffic intersection 1. In the FIG. 1 example of the traffic intersection 1, four traffic routes 2 meet. Each traffic lane has several lanes 4, which can be provided for different directions of travel. In addition, each traffic route 2 has a cycle path 6 and a footpath 8 on both sides.

The lanes 4 approaching the intersection have a stop line 10. The outer intersection region is bordered inwards by a black quadrilateral 12 which has been laid through the 4 stop lines 10. Everything outside the quadrilateral 12 is called the outer intersection region. The connecting lines 14 of the intersecting traffic routes 2 define the inner intersection region in the form of an irregular quadrilateral. The connecting lines are shown as bold dashed lines and correspond to the course of the intersecting traffic routes 2 that they would have had without the intersection 1. Trajectories of motorized vehicles may intersect in this area. Some of these trajectories are shown in bold dotted lines. The area between the inner intersection region 16 and the quadrilateral 12 is the extended inner intersection region.

FIG. 2 shows the same intersection 1 in a top view. In addition, a first radar sensor 18 and a second radar sensor 20 are now drawn. The first radar sensor 18 monitors with its first detection region 22, the boundaries of which are shown schematically by two solid lines, in particular the traffic lane 2 entering from the right. The radar sensor 20 monitors with its second detection region 24, the boundaries of which are shown schematically by two dashed lines, in particular the traffic lane 2 entering from above. An overlapping region 26 is shaded in which the first detection area 20 and the second detection area 24 overlap. Road users located in this overlapping region 26 are consequently detected by both the first radar sensor 18 and the second radar sensor 20. In the application shown, this is in particular a pedestrian crossing 28 and a cyclist crossing 30, i.e. parts of the traffic routes where in particular vulnerable road users, namely cyclists and pedestrians, cross a dangerous area, namely a road.

Figure 3:
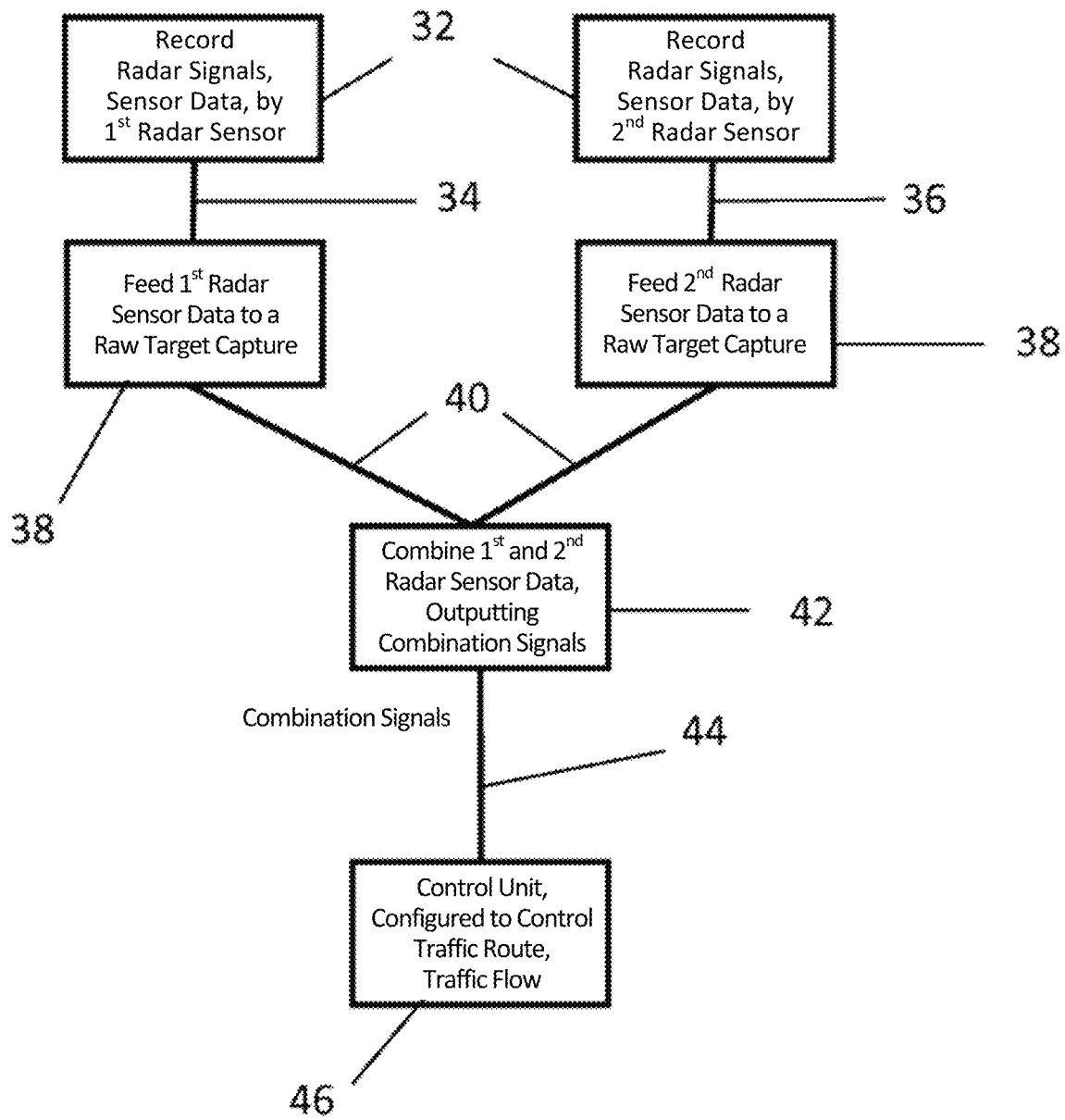
FIG. 3 shows a schematic flowchart of a method according to an embodiment for controlling traffic flow.

FIG. 3 schematically shows the flowchart of a method with which the traffic flow can be controlled. In a first step 32, in the example of an embodiment shown, radar signals and sensor data are recorded by two radar sensors. The two radar sensors emit radar waves that are reflected by the road users. In this case, first radar sensor data 34 from the first radar sensor 18 and second radar sensor data 36 from the second radar sensor 20 are fed to a raw target capture 38, which can also be referred to as raw target detection and in which, in particular, the position and a radial velocity of each individual detected road user are determined by the respective radar sensor, preferably in a single measurement cycle. These are then brought together along the lines 40 and combined in the electronic data processing device in process step 42. The resulting combination signals 44 are fed to a control unit 46, which is responsible for the actual control of the traffic route and traffic flow.

REFERENCE LIST

1 intersection
2 traffic route
4 traffic lane
6 cycle lane
8 footpath
10 stop line
12 quadrilateral
14 connection line
16 inner intersection region
18 first radar sensor
20 second radar sensor
22 first detection region
24 second detection region
26 overlapping region
28 pedestrian crossing
30 cyclist crossing
32 first step
34 sensor data of the first radar sensor
36 sensor data of the second radar sensor
38 raw target detection
40 line
42 process step
44 combination signal
60 control system

The invention claimed is:

1. A system for controlling traffic signalling devices for traffic management at an intersection of at least a first traffic route and a second traffic route, comprising:
   a first radar sensor, configured to: transmit first radar signals, receive reflections of the first radar signals from road users within a first detection region on the first traffic route or on a first part of the intersection, and output, based on the received reflections of the first radar signals, first radar sensor detected first radar reflection signals that carry information related to first radar sensor referenced road user positions and/or first radar sensor referenced road user radial velocities;
   a second radar sensor, configured to: transmit second radar signals, receive reflections of the second radar signals from road users within a second detection region on the second traffic route or on a second part of the intersection, and output, based on the received reflections of the second radar signals, second radar sensor detected second radar reflection signals that carry information related to second radar sensor referenced road user positions and/or second radar sensor referenced road user radial velocities, wherein the first radar sensor and the second radar sensor are mutually configured to transmit the first radar signals and the second radar signals, as not interfering with one another, wherein the first radar sensor and the second radar sensor are positioned at respectively different locations, or according to respectively different orientations, or both, and are further configured such that the first detection region and the second detection region overlap in at least one overlapping region; and an electronic data processing device configured to:
receive the first radar sensor detected first radar reflection signals and the second radar sensor detected second radar reflection signals and at least partially combine the first radar sensor detected first radar reflection signals and the second radar sensor detected second radar reflection signals into combination detected radar reflection signals, and control the traffic signalling devices at the intersection, based at least partially on the combination detected radar reflection signals.

2. The system according to claim 1 for controlling traffic signalling devices for traffic management at an intersection, wherein at least one of the first radar sensor and the second radar sensor is further configured and/or further arranged to detect a road user in an inner intersection region and/or an extended inner intersection region and/or several traffic lanes.

3. The system according to claim 1 for controlling traffic signalling devices for traffic management at an intersection, wherein the first radar sensor is further configured to determine a first radar sensor detected road user position and a first radar sensor detected road user radial velocity in one measurement cycle of the first radar sensor, or the second radar sensor is further configured to determine a second radar sensor detected road user position and a second radar sensor detected road user radial velocity in one measurement cycle of the second radar sensor, or both.

4. The system according to claim 1 for controlling traffic signalling devices for traffic management at an intersection, wherein the electronic data processing device is further configured to transmit information about detected road users to other detected road users.

5. The system according to claim 1 for controlling traffic signalling devices for traffic management at an intersection, wherein the electronic data processing device is further configured to:
estimate, based at least in part on the combination signals, a future traffic volume in the intersection,
determine a future adjustment of the traffic signalling devices, based at least in part on the estimated future traffic volume in the intersection,
transmit information about the future adjustment to one or more of the detected road users, and
perform the future adjustment.

6. The system according to claim 1 for controlling traffic signalling devices for traffic management at an intersection, wherein the electronic data processing device is further configured to:
perform an assignment of the detected road users, the assignment being to one or more of a vehicle class, a traffic lane, and a direction of travel, and adjust and/or to further base control of the traffic signalling devices at least in part on the respective assignment of one or more of the detected road users.

7. The system according to claim 6 for controlling traffic signalling devices for traffic management at an intersection, wherein the electronic data processing device is also further configured to:
provide data for at least one traffic lane or one travel trajectory that is curved, and
adjust, and/or to further base control of the traffic signalling devices at least in part on the data for at least one traffic lane or one travel trajectory that is curved.

8. The system according to claim 1 for controlling traffic signalling devices for traffic management at an intersection, wherein the system is configured for one or more of Stop Bar Detection, Queue Length, Advance Detection, Speed Enforcement, Red Light Enforcement, Estimated Time of Arrival (ETA) applications, and for counting and/or classifying road users.

9. The system according to claim 1 for controlling traffic signalling devices for traffic management at an intersection, wherein the first radar sensor and the second radar sensor are synchronised to one another in terms of time.

10. The system according to claim 9 for controlling traffic signalling devices for traffic management at an intersection, wherein synchronization is alternate or offset in time.

11. The system according to claim 1 for controlling traffic signalling devices for traffic management at an intersection, wherein the first radar sensor is further configured to transmit the first radar signals in a form of first frequency ramps (FMCW) and the second radar sensor is further configured to transmit the second radar signals in a form of second FMCW, wherein the first FMCW and the second FMCW differ from one another in frequency ramp duration, frequency ramp stroke and/or frequency ramp repetition frequency.

12. The system according to claim 1 for controlling traffic signalling devices for traffic management at an intersection, wherein the first radar sensor and the second radar sensor are configured to respectively emit frequency modulated radar waves and wherein the first radar sensor and the second radar sensor use respectively different start frequencies and/or centre frequencies.

13. The system according to claim 1 for controlling traffic signalling devices for traffic management at an intersection, wherein the first radar sensor is configured to emit first phase modulated radar waves (PMCW), using a first digital code, and the second radar sensor is configured to emit second PMCW, using a second digital code, and the first digital cod the second digital code differ.

14. The system according to claim 13 for controlling traffic signalling devices for traffic management at an intersection, wherein the digital codes for the first radar sensor and the second radar sensor are orthogonal to one another.

15. The system according to claim 1 for controlling traffic signalling devices for traffic management at an intersection, where the electronic data processing device first radar sensor is further configured to:
determine, based on the first radar sensor detected first radar reflection signals, a position of a road user in the first detection region and a radial velocity of the road user in the first detection region, and
determine, based on the second radar sensor detected second radar reflection signals, a position of another road user in the second detection region and a radial velocity of the road user in the second detection region.

16. The system according to claim 1 for controlling traffic signalling devices for traffic management at an intersection, wherein the electronic data processing is further configured to detect a first reflection cross-section of a road user in the at least one overlapping region, based on the first radar sensor detected first radar reflection signals, and to detect a second reflection cross-section of said road user in the at least one overlapping region, based on the second radar sensor detected second radar reflection signals.

* * * * *